United States Patent Office 2,813,867
Patented Nov. 19, 1957

2,813,867
1,2-DICARBAMYL-1,2,3,6-TETRAHYDROPYRIDA-ZINES AND THEIR PREPARATION

William T. Hunter, Minneapolis, Minn., assignor to Sterling Drug Inc., New York, N. Y., a corporation of Delaware No Drawing. Application June 10, 1955, Serial No. 514,688

4 Claims. (Cl. 260—250)

This invention relates to 1,2-dicarbamyl-1,2,3,6-tetrahydropyridazine and derivatives thereof substituted in either or both of the 3- and 6-positions by a lower-alkyl group, and to a process for preparing the same.

According to the present invention a Diels-Alder reaction can be effected between an alkadiene, having conjugated double bonds and containing from four to twelve carbon atoms, and azodicarboxamide, provided the temperature of the reaction mixture is maintained above about 50° C. by applied heat. The reaction is conducted in the range between about 50° C. and preferably below about 150° C., under the vapor pressure of the reaction mixture at the temperature employed. The process is preferably conducted with the reactants dispersed in a solvent which remains liquid and is chemically inert under the conditions of the reaction and which is not a solvent for the desired product. The pyridazine precipitates from the reaction mixture as it is formed and can be separated by filtration.

The compounds of the invention are represented structurally by the formula:

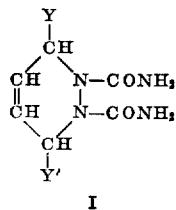

I wherein Y and Y' represent hydrogen atoms or lower-alkyl groups having from one to four, inclusive, carbon atoms and can be either straight or branched in configuration. Among the alkadienes which can be employed in practicing the invention are 1,3-butadiene, 1,3-pentadiene, 2,4-hexadiene, 3,5-octadiene, 2,7-dimethyl-3,5-octadiene, 5,7-dodecadiene, and the like.

It has been found preferable to introduce the azodicarboxamide into the reactor, add the solvent, and then introduce the alkadiene in excess over that theoretically required to react with the amide. Among the solvents for the reactants are liquid dialkylformamides, such as dimethylformamide, and dialkylsulfoxides, such as dimethylsulfoxide. The reactor is then closed and heated at the desired temperature for several hours. The optimum temperature for obtaining the best yields is about 100° C. and the reactor should be maintained at a temperature within the range recited for a period of about three to five hours. The reactor is then cooled and the reacted mixture rinsed therefrom with a non-polar liquid which is not a solvent for the product, such as benzene or toluene. The product is then filtered and the crystals so-obtained recrystallized, as from water, and dried. Yields of the desired pyridazine above 75%, based on the starting azodicarboxamide, can consistently be obtained according to the foregoing procedure.

The following example illustrates in detail a specific embodiment of the invention: A mixture of 312 g. (2.7 moles) of azodicarboxamide, 750 ml. of dimethylformamide, and 650 ml. of butadiene (mixed in that order) was heated in an autoclave at 100° C. for four hours. The reaction mixture was cooled and the mixture rinsed from the autoclave liner with benzene. The solid product was collected by filtration, washed with n-pentane, and air dried, giving 346 g. of 1,2-dicarbamyl-1,2,3,6-tetrahydropyridazine. A sample when recrystallized twice from water had the M. P. 253–255.5° C.

Analysis.—Calcd. for $C_6H_{10}N_4O_2$: N, 32.92; O, 18.20. Found: N, 32.84; O, 19.20.

Other pyridazines can be produced by repeating the above example, observing the same conditions for conducting the process, by substituting a molar equivalent amount of a $C_5$ to $C_{12}$ alkadiene for the butadiene therein used. Thus, 1,2-dicarbamyl-3,6 - dimethyl - 1,2,3,6-tetrahydropyridazine can be obtained with 2,4-hexadiene, by way of illustration.

The 1,2-dicarbamyl-1,2,3,6-tetrahydropyridazines of the invention are useful as starting materials for the preparation of mercury containing compounds having valuable diuretic properties. Mercuric salts in the presence of methanol add to the double bond to introduce a methoxy group at carbon atom number 4 and a mercury atom at carbon atom number 5, the other valence of the mercury being satisfied by an anion.

Pyrolysis of a 1,2-dicarbamyl-1,2,3,6-tetrahydropyridazine of Formula I causes elimination of a molecule of ammonia and formation of a cyclic imide (II) having the formula

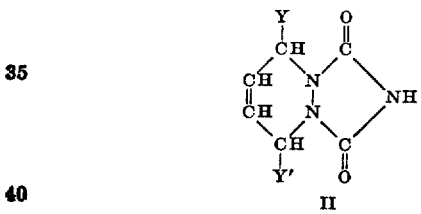

II

Said cyclic imide possesses diuretic activity, and it and its N-alkylated derivatives are disclosed and claimed in the copending application of R. L. Clarke, Serial No. 514,686, filed June 10, 1955. Said cyclic imides also serve as intermediates for the preparation of mercurial diuretics, which are disclosed and claimed in the copending application of R. L. Clarke and F. W. Gubitz, Serial No. 514,687, filed June 10, 1955. For example, 1,6,8-triazabicyclo[4,3,0]-3-nonene-7,9-dione (II, Y and Y'=H) reacts with mercuric acetate in hot methanol to give 3 - acetoxymercuri-4-methoxy - 1,6,8 - triazabicyclo-[4,3,0]nonane-7,9-dione, which when treated with sodium hydroxide gives 3-hydroxymercuri - 4 - methoxy-1,6,8-triazabicyclo[4,3,0]nonane-7,9-dione (III) having the formula

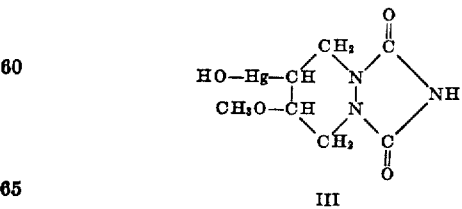

III

The latter compound was found to produce diuresis in dogs when administered in doses which produced no manifestations of toxicity or irritation.

What is claimed is:
1. The process which includes reacting an alkadiene having conjugated double bonds and containing from

4 to 12 carbon atoms with azodicarboxamide at a temperature above about 50° C.

2. The process for preparing 1,2-dicarbamyl-1,2,3,6-tetrahydropyridazine which comprises reacting azodicarboxamide with butadiene at between about 50° C. and 150° C. in a solvent chemically inert under the conditions of the reaction.

3. Alkyl-substituted 1,2-dicarbamyl-1,2,3,6-tetrahydropyridazines.

4. The compound having the formula

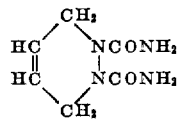

References Cited in the file of this patent

MacKenzie et al.: J. Org. Chem. 17, 1666–1674 (1952).
Barranger et al.: Compt. Rend. 236, 1365–1367 (1953).
Richter: Textbook of Organic Chemistry, page 204 (1938 ed.).

UNITED STATES PATENT OFFICE

CERTIFICATE OF CORRECTION

Patent No. 2,813,867

November 19, 1957

William T. Hunter

It is hereby certified that error appears in the printed specification of the above numbered patent requiring correction and that the said Letters Patent should read as corrected below.

Column 2, line 11, for "0, 18.20." read -- 0, 18.80. --.

Signed and sealed this 11th day of February 1958.

(SEAL)
Attest:

KARL H. AXLINE
Attesting Officer

ROBERT C. WATSON
Commissioner of Patents